Feb. 6, 1923.                                                            1,444,367
C. B. COLLAMER NOW BY JUDICIAL CHANGE OF NAME C. B. BROLLIAR
AQUARIUM
Filed Aug. 15, 1921
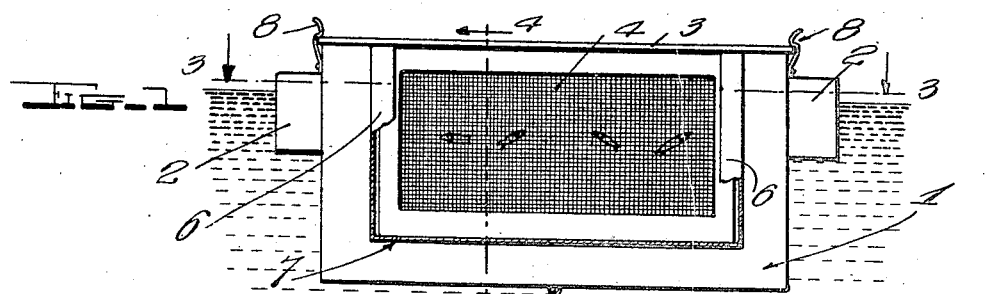
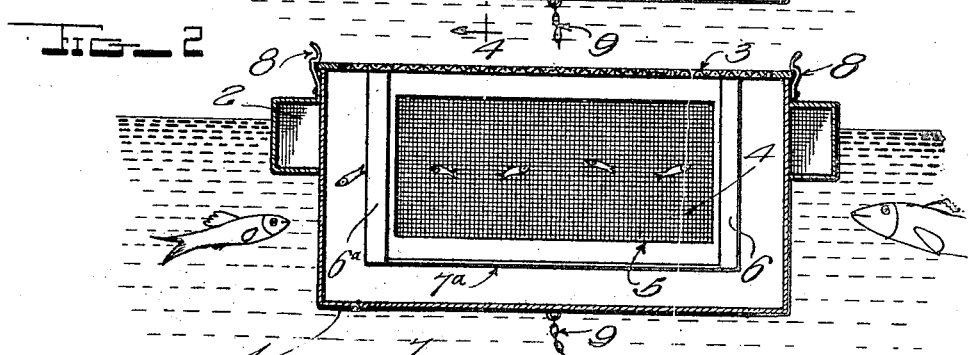
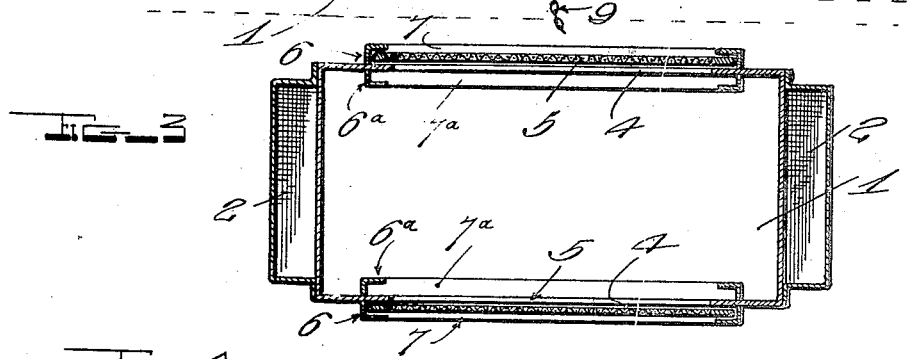
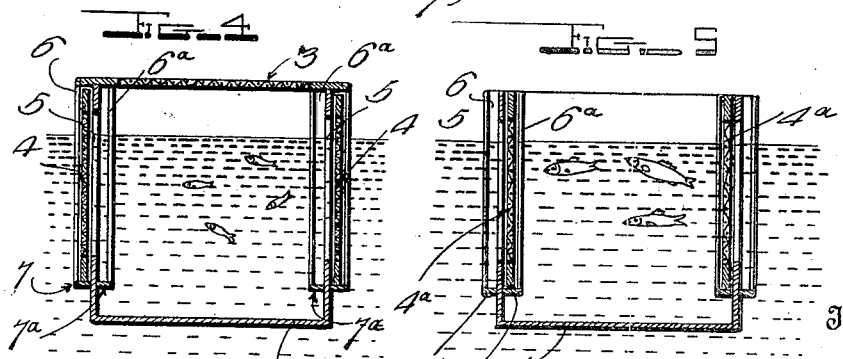
Inventor
C. B. Collamer
Attorneys Patented Feb. 6, 1923.

1,444,367

UNITED STATES PATENT OFFICE.

CLARA BROWN COLLAMER (NOW BY JUDICIAL CHANGE OF NAME CLARA B. BROLLIAR), OF FORT COLLINS, COLORADO.

AQUARIUM.

Application filed August 15, 1921. Serial No. 492,388.

*To all whom it may concern:*

Be it known that I, CLARA BROWN COLLAMER (now by judicial change of name CLARA B. BROLLIAR), a citizen of the United States, residing at Fort Collins, in the county of Larimer and State of Colorado, have invented certain new and useful Improvements in Aquariums; and I do declare the following to be a full, clear, and exact description of the invention, such as will enable others skilled in the art to which it appertains to make and use the same.

My invention relates to improvements in aquariums and has for its object to provide a simply constructed device of this character which may be partially submerged in a body of water for the purpose of protecting young fish against larger fish until they have reached a size at which they can protect themselves, screens being provided to admit water into the aquarium from the lake, stream or the like in which it is located and provision being made whereby screens of larger mesh may be used as the fish increase in size. With the foregoing in view, the invention resides in the novel subject matter hereinafter described and claimed, the descriptive matter being supplemented by the accompanying drawings.

Figure 1 is a side elevation, partly in section, showing an aquarium constructed in accordance with my invention.

Figure 2 is a central vertical longitudinal sectional view.

Figure 3 is a horizontal section as indicated by line 3—3 of Fig. 1.

Figure 4 is a vertical transverse sectional view as indicated by line 4—4 of Fig. 1.

Figure 5 is a duplicate of Fig. 4 with the exception that it illustrates the manner in which larger screens are used.

In the drawings above briefly described, the numeral 1 designates a preferably rectangular tank to be constructed of any suitable material, said tank being equipped near its upper edge with floats 2 for supporting it at a predetermined depth in a body of water, the arrangement of floats being such that the upper end of the tank extends above the water level to admit air through a screen or other suitable open work top 3.

One or both sides of the tank 1 may be provided with a screen or screens such as those indicated at 4, each screen serving to admit water through an inlet opening 5, but acting to prevent the escape of the small fish through this opening, from the tank 1.

For holding each screen 4 in place, I provide vertical and horizontal guide strips 6 and 7 respectively which may be secured to the outer side of the tank wall. Each screen 4 is of rather small mesh, but it is intended to substitute a screen 4ª of larger mesh for each of the screens 4, when the fish have gained sufficient size. To permit the screen 4ª to be inserted before the screen 4 is removed, additional guide strips 6ª and 7ª are provided at the inner side of the tank walls. When the screen 4ª is inserted, the screen 4 may be removed as will be clear by comparing Figures 4 and 5.

All of the screens are preferably of such height as to permit the projecting edge portion of the top 3 to rest thereon, thereby preventing the screens from being accidentally removed. Suitable latches 8 are employed to hold the top 3 in closed position.

My invention is intended principally for use as a trout brooder and may be anchored by means of a chain or the like 9 in any suitable body of water to serve as a container for the young trout until they have reached a size at which they can protect themselves. They are thus protected against being devoured by larger fish as now often occurs.

I claim:

1. An aquarium comprising a horizontally elongated rectangular tank adapted to be partly submerged in a body of water and having its opposed ends provided with outstanding floats adjacent their upper portions to support the tank, the opposite side walls of said tank being provided with rectangular openings and vertical screen guides at the edges thereof, removable screens within said guides and movable upwardly therefrom, a top for tank extending over said screens and normally preventing removal thereof, and means for detachably securing said top in place.

2. An aquarium comprising a tank adapted to be partly submerged in a body of water, float means for supporting said tank with its upper end above water, the wall of said tank having a water inlet opening, screen guides at the edges of said opening and on both the interior and exterior of the tank, and screens of different mesh for successive disposition in said guides for the purpose specified.

In testimony whereof I have hereunto set my hand.

CLARA BROWN COLLAMER.